United States Patent [19]

Hotta et al.

[11] 4,439,569
[45] Mar. 27, 1984

[54] POLYMERIC THERMO-SENSITIVE MATERIAL

[75] Inventors: Shu Hotta, Katano; Yoshio Kishimoto, Hirakata; Wataru Shimotsuma, Ibaraki, all of Japan

[73] Assignee: Matsushita Electric Industrial Co., Ltd., Japan

[21] Appl. No.: 421,577

[22] Filed: Sep. 22, 1982

Related U.S. Application Data

[63] Continuation of Ser. No. 202,179, Oct. 28, 1980, abandoned.

[30] Foreign Application Priority Data

Oct. 30, 1979 [JP] Japan .................. 54-140950
Nov. 13, 1979 [JP] Japan .................. 54-147298
Mar. 25, 1980 [JP] Japan .................. 55-38454

[51] Int. Cl.$^3$ .................. C08K 5/51; C08K 5/53; C08K 3/30
[52] U.S. Cl. .................. 524/128; 524/134; 524/135; 524/146; 524/330; 524/420; 428/379; 428/383; 174/110 N

[58] Field of Search .................. 174/110 N; 428/379, 428/383; 524/128, 134, 135, 146, 330, 333, 420

[56] References Cited

U.S. PATENT DOCUMENTS 2,493,597 3/1946 Rothrock, Jr. et al. .......... 525/420
3,086,960 4/1963 Bletso .................. 524/333
3,384,616 3/1968 Heller et al. .......... 524/327
3,640,948 2/1972 Jackson .................. 524/333

Primary Examiner—John Kight, III
Assistant Examiner—Kriellion Morgan
Attorney, Agent, or Firm—Wenderoth, Lind & Ponack

[57] ABSTRACT

This invention is directed to a polymeric thermo-sensitive material which comprises a polyamide composition containing compounds of sulphur-contained compounds or phosphorous acid ester, and which is smaller in polarization in the application of direct-current electric field, higher in temperature detection function, does not cause flexibility deterioration due to heating operation and is less in hygroscopicity. A composition containing thiophosphorous acid ester and bis(hydroxyphenyl) sulfide derivative from a group of the phosphorous acid ester is particularly superior in quality.

4 Claims, 3 Drawing Figures

POLYMERIC THERMO-SENSITIVE MATERIAL

This is a continuation of Ser. No. 202,179, filed Oct. 28, 1980, now abandoned.

The present invention relates to a thermo-sensitive material for use in a flexible wire-like temperature detecting element, which is employed in a temperature detecting apparatus for regulating the temperature of a heating element such as an electric blanket, electric carpet or the like.

Conventionally, as polymeric thermo-sensitive materials for achieving the above-described object, polymeric compositions were often used, the compositions having a small amount of material, which gives ionic conductivity such as an interfacial activator or the like, added to a flexible resin such as soft polyvinyl chloride or the like. However, since the conductive carriers of these compositions were ionic materials, polarization occurred upon application of a direct-current electric field, with the result that the polymeric compositions could not be used as the thermo-sensitive material for a heat-sensing heater as described later.

Also, as disclosed in the Japanese Patent Laid-Open Publications Nos. 4597/1976 and 116495/1978, polyamide compositions are proposed, which are improved in temperature detecting function due to addition of a compound larger in dielectric constant change with respect to temperature. However, these compositions are improved in temperature detecting function, but no consideration is given to their direct-current polarization. Thiourea derivatives such as, thiobarbituric acid or the like or copper halides, which were usually used for this purpose, are easily ion-dissociated in the polyamide, and the polyamide compositions containing these thiourea derivatives exhibit polarization upon application of a direct-current electric field, thereby causing a large change in impedance with respect to time. Accordingly, these compositions are not suitable for use in thermo-sensitive materials as described later.

The general construction of the temperature detecting heater in the form of a wire is shown in FIG. 1. In FIG. 1, an inner-side detecting strand 2 wound around a heat-proof core 1, which functions as a heater, receives signals to be transmitted between an outer-side detecting strand 3 and the inner-side detecting strand 2. A polymeric thermo-sensitive material 4, is interposed between the outer-side detecting strand 2 and the inner-side detecting strand 3, and a housing 5 is provided to cover the outer-side detecting strand 3. Direct currents or half-wave rectification waves are applied to the heater from an outside power source (not shown in the drawing) in a known manner so that the heater is energized and heated by means of the electric current. The temperature of the heater is detected through application of the alternating-current voltage between the outer-side detecting strand 2 and the inner-side detecting strand 3 to obtain temperature signals.

In fact, if such ion conductivity material as described hereinabove is used as the thermo-sensitive material for the temperature detecting heater, polarization results from application of a direct-current electric field thereto, which is adapted to energize and heat the heater, and the resistance value thereof changes with respect to time, whereby the ion conductivity material certainly cannot be used as a thermo-sensitive material for the temperature detecting heater.

Therefore, as shown in the Japanese Patent Laid-Open Publication No. 12692/1976, phosphoric acid, boric acid, or a phosphorous or boron compound is added to try to prevent polarization of the thermo-sensitive material. However, since they are superior in hygroscopicity, the polyamide compositions with these compounds added thereto have a considerable impedance decrease under high humidity so that the polyamide compositions pose great difficulties in practical use in a temperature detecting heater.

As a similar example, the Japanese Patent Publication No. 42314/1976 discloses a composition, which is improved in humidity resistance through a blending of hydroxy-phenyl-group-introduced phosphoric acid ester with the polyamide. However, such as polyamide composition with phosphorus, boron compound or phosphoric acid ester in both of the above-described compositions blended therein is completely impaired in bending and flexibility, which properties are required in a thermo-sensitive material after it has been left in high-temperature air.

The object of the present invention is to provide a polymeric thermo-sensitive material to be used for a temperature detecting heater, which is free from the above disadvantages inherent to the conventional ones, and which is smaller in polarization and hygroscopicity, higher in temperature detecting function, and not deteriorated in flexibility through thermal deterioration.

Another important object of the present invention is to provide a thermo-sensitive material composed of a polyamide composition containing a sulphur compound or phosphorous acid ester therein, thereby to obtain such characteristics as described hereinabove.

Accordingly, the polymeric thermo-sensitive material of the present invention is composed of a polyamide composition containing at least one type of sulphur compound or phosphorous acid ester, said sulphur-containing compound being selected from the group consisting of bis(hydroxyphenyl)sulfide, mercaptothiazole, mercaptoimidazole and their derivatives, and thiophosphorous acid esters.

These and other objects, features and aspects of the present invention will become more apparent from the following detailed description of the present invention when taken in conjunction with the accompanying drawings.

Figure 1:
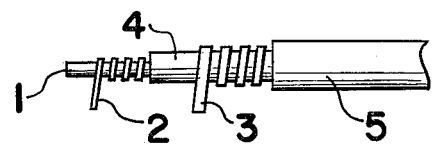
FIG. 1 is a development view showing a temperature detecting heater for the purpose of illustrating the construction thereof as mentioned above.

First of all, it is to be noted that a polyamide composition containing a sulphur compound compound or therein is employed as the polymeric thermo-sensitive material of the present invention.

The following are enumerated as effective sulphur compounds.
 (1) Bis(hydroxyphenyl)sulfide and its derivatives
 (2) Mercaptothiazole and its derivatives
 (3) Mercaptoimidazoles and its derivatives
 (4) Thiophosphorous acid esters In the above compounds, the thiophorphorous acid ester are represented by the following formulas, wherein $Z_1$ through $Z_3$ represent sulphur atoms or oxygen atoms, containing at least one phosphorous-sulphur combination in the molecule, and $R_1$ through $R_4$ are hydrocarbon groups, i.e. alkyl groups, phenyl group or phenyl substituted alkyl groups and the carbons of the alkyl group are 1 through 27 in number.

(1) Compounds represented by the formula:

$$R_1Z_1-\underset{\underset{Z_3R_3}{|}}{P}-Z_2R_2$$

(wherein $R_1$ through $R_3$ are hydrocarbon groups and one of them may be a hydrogen atom); such as tris(phenylthio)phosphite, bis(phenylthio)monodecylphosphite, bis(laurylthio)hydrogenphosphite or the like.

(2) Compounds in which groups having the formula:

$$R_1Z_1-\underset{\underset{Z_3}{|}}{P}-Z_2R_2$$

(wherein $R_1$, $R_2$ are hydrocarbon groups) are combined with an alkyl or an alkyloxy or an alkylthio group such as tetrakis(phenylthio)dipropyleneglycoldiphosphite, $(\langle O \rangle-S)_2PO\{CH-CH_2-O\}_{\overline{2}}P(S-\langle O \rangle)_2,$
　　　　　　　　　|
　　　　　　　　$CH_3$ tetrakis[mono(phenylthio)mono(tridecylthio)phosphinooxymethyl]methane, $$\left[ \underset{C_{13}H_{27}S}{\overset{\langle O \rangle - S}{\diagdown}} P - OCH_2 \right]_4 C$$

or the like.

It has been found that particularly the following from among these compounds provide extremely advantageous effects for the thermo-sensitive materials.

bis(2-methyl-4-hydroxy-5-t-butylphenyl)sulfide,

[structure: HO-phenyl(CH_3, C(CH_3)_3)-S-phenyl(CH_3, C(CH_3)_3)-OH]

bis(2-hydroxy-3-t-butyl-5-methylphenyl)sulfide,

[structure: t-Bu, OH / HO, t-Bu phenyl-S-phenyl with H_3C and CH_3]

bis[2-methyl-4-(3-alkylthioalkyloyloxy)-5-t-butylphenyl]sulfide, $$R-S-(CH_2)_n-\overset{O}{\underset{\|}{C}}-O-\underset{C(CH_3)_3}{\overset{CH_3}{\langle O \rangle}}-S-\underset{C(CH_3)_3}{\overset{CH_3}{\langle O \rangle}}-O-\overset{O}{\underset{\|}{C}}-(CH_2)_m-S-R$$

(wherein m and n are 2 to 8, respectively, and represents an alkyl group of from 1 to 27 carbons), 2-mercaptobenzothiazole, 2-mercaptobenzoimidazole, trialkyltrithiophosphite, $(RS)_3P$ wherein R is an alkyl group of from 1 to 27 carbons).

It is to be noted here that these sulphur containing compounds to be blended provide better results when 0.1 to 10 parts by weight is provided with respect to 100 parts by weight. When 0.1 or less parts by weight are provided. Sufficient polarization resistance or higher temperature detecting function cannot be provided, while, when 10 or more by weight parts are provided, the flexibility of the composition is impaired. Also, since the thiophosphorous acid ester has the effect of preventing flexibility deterioration due to heating, the use of the thiophosphorous acid ester is particularly effective in achieving the object of the present invention.

On the other hand, the phosphorous acid esters are represented by the following formulae.

(1) Compounds represented by the general formula:

$(RO)_3P$ (2) Compounds in which groups having the formula:

$$R_2O-\underset{\underset{O}{\underset{|}{|}}}{P}-OR_1$$

are combined with an alkyl or an alkyloxy group.

(3) Polymers represented by the general formula:

$$R_4\{OR_1-O-P\}_{\overline{n}}R_2$$
　　　　　　　|
　　　　　　$OR_3$ (4) Compounds represented by the general formula:

$$(RO)_2P\overset{\diagup O}{\underset{\diagdown H}{\|}}$$

In the above formulae, R, $R_1$ through $R_4$ are hydrocarbon groups.

In the above compounds, following are enumerated as the embodiment of the phosphorous acid ester of each of the groups.

(1) Triphenylphosphite, tris(2-ethylhexyl)phosphite
(2) Tetraphenyldipropyleneglycoldiphosphite,

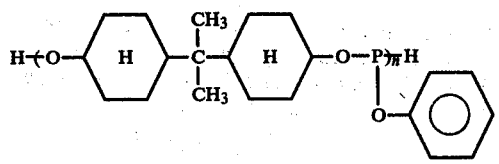

tetraphenyltetra(tridecyl)pentaerythritoltetra phosphite (3) Hydrogenated bisphenol A phosphite polymer,

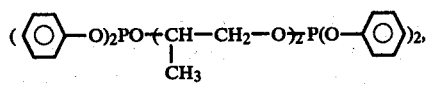

(4) Diphenylhydrogenphosphite, dilaurylhydrogenphosphite

In the above compounds of the thiophosphorous acid ester, each of them has superior resistance to polarization, heat deterioration and humidity. It is to be noted here that the phosphorous acid ester or the like to be blended provides superior results when 0.1 to 10 parts by weight are provided with respect to 100 parts by weight polyamide. When the 0.1 or less by weight part is provided, sufficient resistance to polarization, humidity, temperature detecting function or heat deterioration cannot be provided, while, when 10 or more parts by weight are provided, sufficient mutual solubility is impaired with respect to the polyamide. Also, needless to say, the plasticizer, bulking agent and compounding agent for providing thermistor characteristics, or the like, which is generally used in the polyamide, can be properly blended with respect to these compositions. In addition, it has been found out that a composition, containing at least one bis(hydroxyphenyl)sulfide or derivatives thereof, and at least one thiophosphorous acid ester, as the polymeric thermo-sensitive material of the present invention, is superior in resistance to polarization and heat deterioration as compared with materials excluding either of these. In fact, the joint use of these additives is generally performed to prevent the plastic from being oxidized, and many examples of the prevention of deterioration of mechanical characteristics have been reported to date. Nevertheless, the case wherein polarization is completely suppressed, as shown for example, in FIG. 2 or FIG. 3 in the present invention, is not at all conventionally found.

Especially, it has been found that so-called hindered phenols, among the bis(hydroxyphenyl) sulfides, is extremely effective against polarization. As this form of hindered phenol, bis(2-methyl-4-hydroxy-5-t-butylphenyl)sulfide or bis(2-hydroxy-3-t-butyl-5-methylphenyl)sulfide or the like are enumerated.

In the above hindered phenol, the hindered form means a substance having a large group such as t-butyl group introduced in at least the ortho position with respect to the hydroxy group.

The desirable method of using the hindered phenols as described hereinabove (as the bis(hydroxyphenyl)sulfide) and the thiophosphorous acid esters is to add the thiophosphorous acid ester at approximately 0.1 to 1.0 parts by weight and the bis(hydroxyphenyl)sulfide at approximately 1 to 10 parts by weight, respectively, per 100 parts by weight of the polyamide. This is because the phenol series material is generally superior in mutual solubility with respect to the polyamide composition and a large amount can be added. On the other hand, the thiophosphorous acid ester is slightly inferior in the mutual solubility. In addition to the synergistic effect, the phenol series material generally has the effect of improving the humidity resistance of the polyamide composition, so that the above-described method for using the hindered phenol is recommendable. Accordingly, at least one compound from among the thiophosphorous acid ester and the bis(hydroxyphenyl)sulfide is increased in addition amount to provide superior results for the thermo-sensitive materials. The composition can be provided with the desired degree of polarization and heat-deterioration resistance, through the proper increase and decrease of these compounds, and thus obtained composition is extremely superior in polarization and heat-deterioration resistance, because sulphur atoms contained commonly in the molecules of compounds which constitute thiophosphorous ester or bis(hydroxyphenyl)sulfide seem to perform the specific mutual operations with respect to each other.

Furthermore, a base polymer which becomes the matrix of the thermo-sensitive material used in the present invention is effective for general polyamide composition of all kinds. Among them, polyundecanamide or a polydodecanamide, or copolymer polyamide composed of the polyundecanamide and polydodecanamide is smaller in hygroscopicity and also smaller in electric resistance value change or impedance value change, which is caused due to the hygroscopicity. Thus, these compositions can be used to provide a polymeric thermo-sensitive material which is superior particularly in moisture resistance.

The present invention will be described hereinafter in detail with reference to the following embodiments.

EMBODIMENT 1

Bis(2-methyl-4-hydroxy-5-t-butylphenyl)sulfide at 10 weight parts is dry-blended with polydodecanamide powder at 100 weight parts and is dried for 24 hours in a thermostatic device of 100° C. Thereafter, it is extruded into gut shape by an extrusion molding machine and pelleted with a cutter. After the pellets have been dried, they are worked by an extruding machine for manufacturing wires into a temperature detecting heater as shown in FIG. 1.

EMBODIMENT 2

2-mercaptobenzimidazole at 0.5 weight parts is blended with polydodecanamide powder at 100 weight parts to provide a temperature detecting heater in the same manner as that of Embodiment 1.

EMBODIMENT 3

Bis[2-methyl-4-(3-dodecylthiopropionyloxy)-5-t-butylphenyl]sulfide

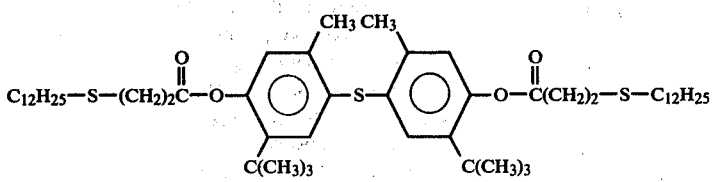

at 2 weight parts is blended with polydodecanamide powder 100 by weight part to provide a temperature detecting heater in the same manner as in Embodiment 1.

EMBODIMENT 4

2-mercaptobenzothiazole 10 by weight part is blended with polydodecanamide powder 100 by weight part to provide a temperature detecting heater in the same manner as in Embodiment 1.

EMBODIMENT 5

Trilauryltrithiophosphite ($C_{12}H_{25}S)_3P$ at 1 weight part is blended with polydodecanamide powder 100 by weight part to provide a temperature detecting heater in the same manner as in Embodiment 1.

COMPARISON EXAMPLE TO BE REFERRED TO EMBODIMENTS 1 TO 5

Polydodecanamide only is used to provide a temperature detecting heater in the same manner as in Embodiments 1 to 5.

Comparisons, in characteristics, between the thermo-sensitive materials in each embodiment 1 to 5 and comparison example are shown in the following Table I.

In the Table I, the thermistor B constant means the thermistor B constant of impedance at 30° C. through 60° C. and the heat resistance is shown by the impedance (measured value at 120° C.) ratio before and after the direct current electric field application of 300 hour 5 V/mm at 120° C.

TABLE I

| | Impedance ($\Omega \cdot cm$) at room temperature | Thermistor B constant (°K.) | Heat resistance |
|---|---|---|---|
| Embodiment 1 | $6.3 \times 10^9$ | 3,200 | 1.4 |
| Embodiment 2 | $6.0 \times 10^9$ | 2,500 | 1.5 |
| Embodiment 3 | $6.4 \times 10^9$ | 3,100 | 1.4 |
| Embodiment 4 | $5.0 \times 10^9$ | 3,400 | 1.6 |
| Embodiment 5 | $6.2 \times 10^9$ | 3,000 | 1.2 |
| Comparison example | $6.2 \times 10^9$ | 2,100 | 3.2 |

As apparent from these results, it is found that the thermo-sensitive materials of the present invention are superior in polarization resistance and temperature detecting function in comparison with single substance polydodecanamide, i.e., in numeral value of thermistor B constant.

Therefore, it is made clear that the polymeric thermo-sensitive material, having a sulphur-containing compound therein, of the present invention has superior electrical characteristics.

The effect of the phosphorous acid ester will be described hereinafter with reference to embodiments 6 to 8.

EMBODIMENT 6

Tris(2-ethylhexyl)phosphite at 0.5 weight parts is added to polydodecanamide powder at 100 weight parts. It is extruded into gut shape by an extrusion molding machine and thereafter is pelleted. After the pellets have been dried, they are worked by an extruding machine for manufacturing wires into a temperature detecting heater as shown in FIG. 1.

EMBODIMENT 7

Tetraphenyldipropyleneglycoldiphosphite at 2 weight parts is blended with polydodecanamide powder at 100 weight parts to provide a temperature detecting heater in the same manner as that of Embodiment 6.

EMBODIMENT 8

Dilaurylhydrogenphosphite at 0.1 weight parts is added to polydodecanamide powder at 100 weight parts to provide a temperature detecting heater in the same manner as that of Embodiment 6.

COMPARISON EXAMPLE 1 TO BE REFERRED TO EMBODIMENTS 6 TO 8

Phosphoric acid at 1 weight part is blended with polydodecanamide powder at 100 weight parts to provide a temperature detecting heater in the same manner as that of Embodiment 6.

COMPARISON EXAMPLE 2

Tris(p-hydroxyphenyl)phosphate at 10 weight parts is blended with polydodecanamide powder at 100 weight parts to provide a temperature detecting heater in the same manner as that of Embodiment 6.

COMPARISON EXAMPLE 3

Polydodecanamide only is used to provide a temperature detecting heater in the same manner as that of embodiment 6.

The comparison, in characteristics, among the thermo-sensitive materials in each of Embodiment 6 to 8 and Comparison examples 1 to 3 will be described in the following Table II.

TABLE II

| Sample | Impedance at room temperature ($\Omega \cdot cm$) | Thermistor B constant (°K.) | Heat resistance | Humidity resistance | Bending |
|---|---|---|---|---|---|
| Embodiment 6 | $6.9 \times 10^9$ | 3,400 | 1.4 | 0.71 | 7,000 |
| Embodiment 7 | $5.8 \times 10^9$ | 3,100 | 1.7 | 0.63 | 7,500 |
| Embodiment 8 | $6.4 \times 10^9$ | 3,100 | 1.5 | 0.60 | 6,500 |
| Comparison example 1 | $6.6 \times 10^9$ | 3,000 | 1.4 | 0.38 | 1,000 |
| Comparison example 2 | $6.2 \times 10^9$ | 3,200 | 1.9 | 0.67 | 1,500 |
| Comparison example 3 | $6.2 \times 10^9$ | 2,100 | 3.2 | 0.44 | 2,000 |

In Table II, the humidity resistance is determined by impedance ratio, i.e., comparison at room temperature, with respect to the absolute dry condition after 70 hours' stay in the air of 45° C. at temperature and 95% in relative humidity, and the bending property is determined by the number of bends leading to the breaking point as a result of 90 degree bending tests after the gut of 2 mm in diameter has stayed for 300 hours in a thermostatic device of 120° C.

As apparent from these results, it is found out that the thermo-sensitive material of the present invention is superior in humidity, polarization, heat-deterioration resistance and temperature detecting function (value of thermistor B constant) as compared with the polydodecanamide alone, is greatly improved in humidity and heat-deterioration resistance as compared with the polydodecanamide composition with phosphoric acid blended therewith, and is considerably improved in heat-deterioration proof as compared with the composition with tris(p-hydroxyphenyl)phosphate blended therewith. Accordingly, it is apparent that the phosphorous-acid-ester-containing polymeric thermo-sensitive material of the present invention is superior in electric characteristics and mechanical characteristics.

Polymeric thermo-sensitive materials containing thiophosphorous acid ester particularly from among sulphur-containing compounds will be described hereinafter in connection with embodiments. Among them, the specific effect of a composition containing the bis(hydroxyphenyl) sulfide will be described hereinafter with reference to Embodiments 9 and 10.

EMBODIMENT 9

Tri(phenylthio)phosphate at 0.1 weight part is added to the polydodecanamide (nylon 12) at 100 weight parts. It is extruded into gut-shape by an extrusion molding machine and thereafter is pelleted. The pellets are dried and are worked by an extruding machine for manufacturing wires into a temperature detecting wire as shown in FIG. 1.

EMBODIMENT 10

Tetrakis(phenylthio)dipropyleneglycoldiphosphite at 10 weight parts is added to the polyundecanamide at 100 weight parts to provide the temperature detecting wire in the same manner as that of the Embodiment 9.

In addition thereto, compounds showing the mutual operation between the thiophosphorous acid ester and the bis(hydroxyphenyl)sulfide will be enumerated hereinafter with reference to Embodiment 11.

EMBODIMENT 11

Bis(laurylthio)hydrogenphosphite at 0.5 weight parts and bis(2-hydroxy-3-t-butyl-5-methylphenyl)sulfide at 5.0 weight parts are added to polydodecanamide at 100 weight parts to provide the temperature detecting wire in the same manner as that of Embodiment 9.

CONVENTIONAL EXAMPLE 1 TO BE COMPARED WITH EMBODIMENT 9

Phosphoric acid at 1.0 weight part is blended with polydodecanamide at 100 weight parts to provide a temperature detecting wire in the same manner as that of Embodiment 9.

CONVENTIONAL EXAMPLE 2

Tris(p-hydroxyphenyl)phosphate at 10 weight parts is blended with the polydodecanamide at 100 weight parts to provide the temperature detecting wire in the same manner as that of Embodiment 9.

CONVENTIONAL EXAMPLE 3

Polydodecanamide only is used to provide the temperature detecting wire in the same manner as that of Embodiment 9.

CONVENTIONAL EXAMPLE 4

Polyundecanamide only is used to provide the temperature detecting wire in the same manner as that of Embodiment 9.

COMPARISON EXAMPLE TO BE REFERRED TO THE CONVENTIONAL EXAMPLES 1 TO 4

As a reference example, there is provided a comparison example in which bis(2-hydroxy-3-t-butyl-5-methylphenyl) sulfide at 5.0 weight parts is added to the polydodecanamide 100 weight parts to assemble the temperature detecting wire in the same manner as that of Embodiment 9.

The comparison in characteristics among the thermo-sensitive materials in the above-described embodiments, the thermo-sensitive materials in the conventional examples and the thermo-sensitive materials in the reference example will be described in the following Table III.

TABLE III

| Sample | Thermistor B Constant (°K.) | Heat resistance | Humidity resistance | Bending |
|---|---|---|---|---|
| Embodiment 9 | 2,700 | 2.0 | 0.73 | 7,000 |
| Embodiment 10 | 3,000 | 1.7 | 0.70 | 8,500 |
| Embodiment 11 | 3,700 | 0.9 | 0.85 | 45,000 |
| Conventional example 1 | 3,000 | 1.4 | 0.38 | 1,000 |
| Conventional example 2 | 3,200 | 1.9 | 0.67 | 1,500 |
| Conventional example 3 | 2,100 | 3.2 | 0.44 | 2,000 |
| Conventional example 4 | 1,800 | 3.7 | 0.40 | 1,500 |
| Comparison example | 3,400 | 1.5 | 0.80 | 6,000 |

As apparent from the above-described results, it is found that the polymeric thermo-sensitive material to be used in the thermo-sensitive heaters of the embodiments 9, 10 is superior in polarization, heat-deterioration and humidity resistance as compared with polydodecanamide (nylon 12) alone, in the conventional Embodiment 3 or polyundecanamide (nylon 11) alone, in the conventional Embodiment 4. Also, it is found out that the polydodecanamide composition in Embodiment 1 is greatly improved in heat-deterioration and humidity resistance as compared with the conventional Example 1 with the phosphoric acid blended and considerably improved in heat-deterioration resistance as compared with the composition of the conventional Example 2, with the tris(p-hydroxyphenyl) phosphate blended.

In addition, as apparent in Embodiment 12, effects are considerable in the improvement in polarization and heat-deterioration resistance in the case where the thiophosphorous acid ester and the bis(hydroxyphenyl)sulfide are jointly used. Among them, as shown in Embodiment 11, the effect of the bis(hydroxyphenyl) sulfide series is extremely superior to completely prevent the increase in impedance value in a case where the direct-current electric field has been applied.

With the above results, it is made clear that the polymeric thermo-sensitive material in the present invention is superior in electric and mechanical characteristics.

EMBODIMENT 12

Figure 2:
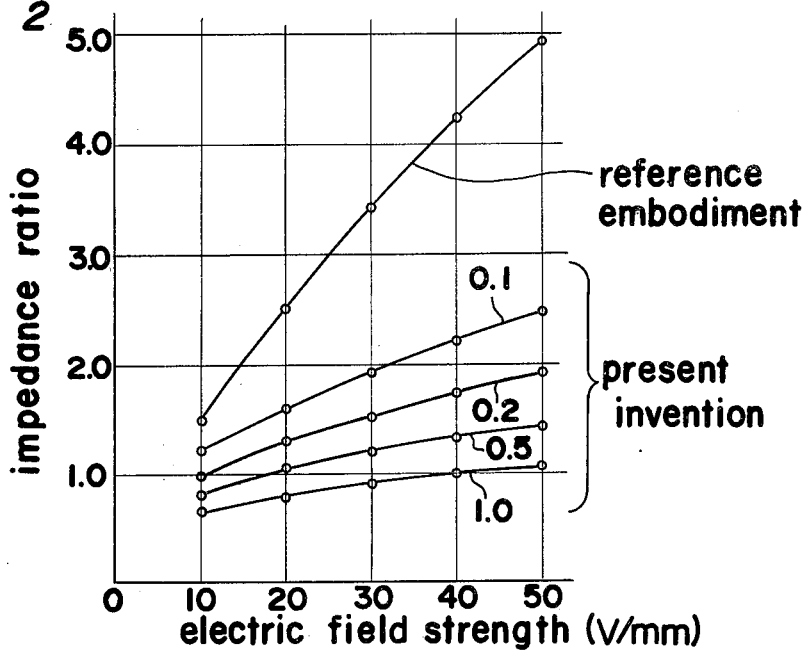
FIGS. 2 and 3 are graphs showing the relationship between the impressed electric-field strength and impedance ratio of a temperature detecting heater with the polyamide thermo-sensitive materials of the present invention, respectively, the polyamides containing different amounts of thiophosphorous acid ester or bis(hydroxyphenyl)sulfide.

Bis(2-hydroxy-3-t-butyl-5-methylphenyl)sulfide at 5.0 weight parts is added to the polydodecanamide at 100 weight parts into master batches, and, thereafter, tris(phenylthio)phosphites at 0.1, 0.2, 0.5, 1.0 weight parts are separately added, respectively, to the master batches to provide the temperature detecting wires in the same manner as that of Embodiment 1. These four types of samples each including trisphosphites of 0.1, 0.2, 0.5, 1.0 parts by weight are further divided into five groups, and each of them was thrown into a drying machine of 120° C. These direct-current electric fields, which are varied by 10 V/mm from 10 V/mm to 50 V/mm, are applied to each of the samples for 300 hours, and the impedance ratio before and after the application is calculated. The relationship of the electric field strength and impedance ratio is plotted with the addition amount of the tris(phenylthio)phosphite as parameters within the graph of FIG. 2. In a reference embodiment to be compared with the embodiment 12 the tris(phenylthio)phosphite is added, and this result is also shown in FIG. 2. In FIG. 2, the numeral values of curve shoulder portions show the addition amounts (hereinafter referred to as phr) of the tris(phenylthio)phosphite with respect to the polydodecanamide at 100 parts by weight.

As apparent from FIG. 2, the impedance ratio decreases with increase in the amount of addition of the tris(phenylthio)phosphite when the electric field of the same electric field strength is applied. Through the comparison of the embodiment 12 with the reference embodiment, a sufficient effect can be recognized even with the addition of 0.1 phr. Also, the optimum composition as a polymeric thermo-sensitive material can be provided through the variation of the addition amount in accordance with the electric field strength to be applied to these temperature detecting wires of the present invention. For example, as apparent from FIG. 2, the addition amount of the tris(phenylthio)phosphite is required to be 0.1 phr when the polymeric thermo-sensitive material is used through application of 10 V/mm electric field upon the thermo-sensitive material, and the superior results can be realized when the addition amount is, respectively, 0.5, 1.0 phr in the case of 20 V/mm, 40 V/mm through 50 V/mm.

EMBODIMENT 13

Tetrakis[mono(phenylthio)mono(tridecylthio) phosphinooxymethyl]methane at 1.0 weight part is added to the polyundecanamide 100 by weight part into master batches, and, thereafter, bis(2-methyl-4-hydroxy-5-t-butylphenyl)sulfides at, 0.1, 1.0, 5.0, 10 weight parts are separately added to the master batches to provide the temperature detecting wires in the same manner as that of the embodiment 1. These four types of samples, each including bis sulfides at 0.1, 1.0, 5.0, 10 weight parts are further divided into five groups, and each of them was thrown into a drying machine of 120° C. as in Embodiment 6. These direct-current electric fields, which are varied by 10 V/mm from 10 V/mm to 50 V/mm, are applied to each of the samples for 300 hours, and the impedance ratio before and after the application is calculated. The relationship between the electric field strength and impedance ratio is plotted with the addition amount (phr) of the bis(2-methyl-4-hydroxy-5-t-butylphenyl)sulfide as parameters within a graph of FIG. 3. In a reference embodiment to be compared with Embodiment 13 the bis(2-methyl-4-hydroxy-5-t-butylphenyl)sulfide is not added, and this result is shown in FIG. 3.

Figure 3:
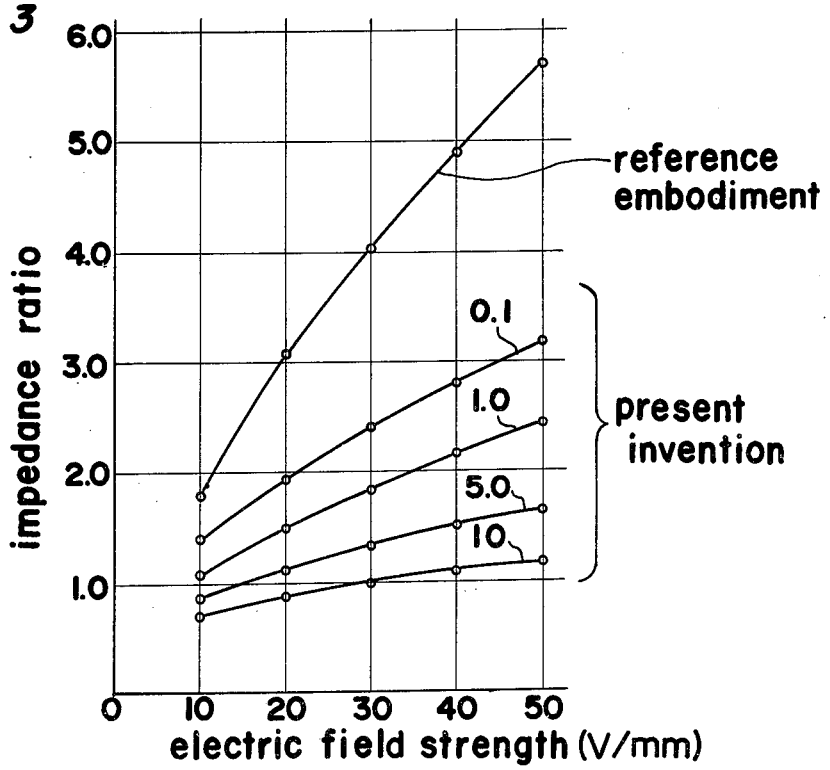

As apparent from FIG. 3, the impedance ratio decreases with increase in the addition amount of the bis(2-methyl-4-hydroxy-5-t-butylphenyl)sulfide when the electric field of the same electric field strength is applied. Through the comparison of Embodiment 13 with the reference embodiment, sufficient effect can be recognized even with the addition of 0.1 phr. Also, the optimum composition as a polymeric thermo-sensitive material can be provided through the variation in the addition amount in accordance with the electric field strength to be applied upon these temperature detecting wires of the present invention, as same as that of Embodiment 12. For example, as apparent from FIG. 3, the superior results can be realized if the strengths of the electric fields to be applied to the polymeric thermo-sensitive material are, respectively, 10 V/mm, 15 V/mm and 30 V/mm when the addition amounts of the bis(2-methyl-4-hydroxy-5-t-butylphenyl)sulfide are, respectively, 1.0, 5.0 and 10 phr.

The above description with respect to Embodiments 12 and 13 means that the polymeric thermo-sensitive material which is most suitable for the heater can be easily provided through increase and decrease in the addition amount of thiophosphorous acid ester (or bis(-hydroxyphenyl)sulfide) in accordance with the strength of the electric field to be applied to the polymeric thermo-sensitive material or the required degree of the heat resistance when the temperature detecting wires shown in Embodiments 12 and 13 are provided in a heater such an electric blanket, electric carpet or the like.

As apparent from the above embodiments 1 through 13, the polymeric thermo-sensitive material in the present invention is not only superior in electrical and mechanical characteristics, but also is capable of wider use as a thermo-sensitive material.

Although the present invention has been fully described by way of example with reference to the attached drawings, it is to be noted that various changes and modifications are apparent to those skilled in the art. Therefore, unless otherwise, such changes and modifications depart from the scope of the present invention, they should be construed as included therein.

What is claimed is:

1. A thermosensitive polyamide composition comprising a polyamide, at least one bis(hydroxyphenyl) sulfide and at least one secondary or tertiary thiophosphorous acid ester, said bis(hydroxyphenyl) sulfide and said thiophosphorous acid ester, each being employed in the amount of 0.1 to 10 weight parts per 100 weight parts of polyamide.

2. The thermosensitive polaymide composition in accordance with claim 1, wherein said polyamide is polyundecanamide or polydodecanamide or copolymer polyamide composed of polyundecanamide or polydodecanamide.

3. The thermosensitive polyamide composition in accordance with claim 1, wherein the bis(hydroxyphenyl) sulfide is bis(2-methyl-4-hydroxy-5-t-butylphenyl) sulfide or bix(2-hydroxy-3-t-butyl-5-methylphenyl) sulfide.

4. The thermosensitive polyamide composition in accordance with claim 1, wherein said thiophosphorous acid ester is a trialkyltrithiophosphite.

* * * * *